(12) United States Patent
Chickering et al.

(10) Patent No.: US 7,389,201 B2
(45) Date of Patent: Jun. 17, 2008

(54) SYSTEM AND PROCESS FOR AUTOMATICALLY PROVIDING FAST RECOMMENDATIONS USING LOCAL PROBABILITY DISTRIBUTIONS

(75) Inventors: David Maxwell Chickering, Bellevue, WA (US); David E. Heckerman, Bellevue, WA (US); Robert Rounthwaite, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 1819 days.

(21) Appl. No.: 09/681,742

(22) Filed: May 30, 2001

(65) Prior Publication Data

US 2002/0184139 A1    Dec. 5, 2002

(51) Int. Cl.
*G06F 19/00* (2006.01)
(52) U.S. Cl. ...................................... 702/181
(58) Field of Classification Search ............... 702/181, 702/182–185, 179, 188; 714/25
See application file for complete search history.

(56) References Cited

U.S. PATENT DOCUMENTS

| 5,249,268 A | 9/1993 | Doucet |
| 5,704,017 A | 12/1997 | Heckerman et al. |
| 5,724,567 A | 3/1998 | Rose et al. |
| 5,754,939 A * | 5/1998 | Herz et al. .................. 455/3.04 |

* cited by examiner

*Primary Examiner*—Edward Raymond
(74) *Attorney, Agent, or Firm*—Lyon & Harr, LLP; Mark A. Watson (57) ABSTRACT

The system and method of the present invention automatically extracts the top k recommendations of objects, such as topics, items, products, books, movies, food, drinks, etc., from a local probabilistic recommendation system. Unlike prior systems, the present invention accomplishes the extraction of the top k recommendations of objects without examining a probability for every object that can be recommended. Further, the system and method of the present invention is capable of being implemented using probabilistic recommendation systems based on any conventional type of probabilistic distribution or machine learning technique, including, for example, decision trees and Bayesian networks.

23 Claims, 3 Drawing Sheets

SYSTEM AND PROCESS FOR AUTOMATICALLY PROVIDING FAST RECOMMENDATIONS USING LOCAL PROBABILITY DISTRIBUTIONS

BACKGROUND OF THE INVENTION

1. Technical Field

The present invention involves a new system and process for automatically determining at least one highest probability recommendation from a local probabilistic recommendation system.

2. Related Art

By way of background, collaborative filtering or recommender systems typically use various probabilistic methods in combination with one or more databases comprised of user preferences to predict additional topics, items, or products a new user might like. Generally, the goal of such systems is to predict the utility of objects to a particular user based on a database of user preferences or votes from a sample or population of other users. Either of two general classes of collaborative filtering algorithms, e.g., memory-based algorithms or model-based collaborative filtering, is often used for making such predictions. Such predictions are made possible by first obtaining a set of user preferences for a particular user. These preferences are obtained either explicitly or implicitly using conventional techniques.

Such systems then typically use these user preferences to predict likely user preferences as to other particular objects by computing probabilities for every possible topic, item, product, etc. that a new user might like. These probabilities are then sorted in decreasing order, and any desired number of the highest probability objects are then returned as recommendations. However, as the number of objects becomes increasingly large, the time required to compute the probabilities, and then sort those probabilities, increases. Consequently, the performance of such systems degrades with increasing numbers of objects, and such systems are unable to provide real-time recommendations as the number of objects increases.

For example, with conventional schemes, a probabilistic model can be used for making predictions in a movie-recommendation application that suggests movies to users based on the other movies that they have seen. One method of implementing such a scheme is to build a probabilistic model over a set of variables representing whether a user has seen particular movies in the set of movies. The model is constructed such that, for each movie, the conditional probability that the user has watched a particular movie is extracted for each movie. In general, such a scheme is used to recommend movies as follows: for each movie that a user has not watched, the probability that the user would have watched the movie is calculated based on the assumption that it is unknown whether the user has actually watched the movie. Such a scheme then recommends those movies that have the highest posterior probability.

In particular, such a conventional scheme determines the probability for every movie, then sorts those probabilities and provides a partial or complete sorted list in order of highest to lowest probability that the user would like to watch each movie. In this example, as the number of movies increases, the time required to compute and sort the probabilities naturally increases. Therefore, as the number of movies in this example increases, it becomes increasingly difficult for such a scheme to provide real-time recommendations as a result of the increased computing time required to make such recommendations.

Consequently, what is needed is a new system and method for automatically determining a set of at least one most likely probabilistic recommendation without the need to determine probabilities for each possible object for which a recommendation could be made.

SUMMARY OF INVENTION

The present invention solves the aforementioned problems, as well as other problems that will become apparent from an understanding of the following description by automatically extracting the top k recommendations of a set of possible objects, such as particular choices, topics, items, products, books, movies, food, drinks, etc., from a local probabilistic recommendation system without examining the probability for every choice or object that can be recommended. A system and process according to the present invention builds on the concept of using a conventional probabilistic model for providing recommendations by first identifying an upper bound for probabilities, or in general, for "utilities" that are functions of the probability distributions for a probabilistic recommendation system. For example, the utility can be described simply as the value of the probability distribution evaluated at a specific point (or "state" for a discrete variable). These utilities are then used in the manner described herein for providing recommendations for likely preferences or choices.

Further, the system and method of the present invention is capable of providing such recommendations for any entity. Such entities include, for example, a person or user to whom recommendations as to possible choices or objects are provided, a computer-based system, such as, for example, a computer operating system where the recommendations are related to probabilistic fault diagnosis, or recommendations as to particular stock picks for a computer program used for automatic stock trading. Clearly, such a system and method can be used for any entity and with any type of choice or object for which for which probabilistic recommendations can be made.

In general, the present invention provides a system and method for automatically determining at least one maximal utility object from a set of objects represented by a probabilistic model. This is accomplished by first sorting upper bounds of a function of the probability distributions for each object in order of highest to lowest. The sorting step need only be performed once, as the sorted upper bounds of the function of the probability distributions may then be used for all subsequent entities. However, in one embodiment, as more data becomes available to the probabilistic model, the probability distributions for the probabilistic model are periodically updated using conventional methods, at which time the upper bounds of the function of the probability distributions for each object are again sorted in order of highest to lowest. Further, the system and method of the present invention is capable of using probabilistic recommendation systems or models based on any conventional type of probabilistic distribution or machine learning technique, including, for example, Bayesian networks with decision trees as the local distributions.

As noted above, the system and method of the present invention can be used for any entity and with any type of choice or object for which probabilistic recommendations can be made. However, for purposes of clarity and explanation only, the following discussion will focus on using the system and method of the present invention to provide recommendations of likely user choices for at least one set of objects. Clearly, it should be appreciated by those skilled in the art that, in the general case, the system and method of the present invention is not limited to merely providing recommendations of such likely user choices.

The present invention is capable of sorting any possible function of the probability distributions representing the objects for determining likely user choices. As mentioned above, the aforementioned "utilities" are simply any desired function of the probability distributions, and can be described as the value of the probability distribution evaluated at a specific point. For example, one example of a "utility" is the probability or state representing whether a particular user watched a particular movie. Thus, in a general embodiment, the utility simply represents a specific "state" for each object or variable which corresponds to the user preferring that object in some manner. Thus, the sorting actually involves sorting on the probability of that specific state. However, in the more general sense, the utility is any arbitrary function of the probability distributions; thus, the sorting actually involves sorting on the function of the probability that the user will prefer the object.

For example, in one embodiment, the utility is simply the probability of the specific state for each object, while in another embodiment, the utility is any other function of the probability distribution, such as, for example, a weighted probability of the specific state or some weighted sum of the probability of all states. One useful utility function for recommending objects, such as movies, that a user is likely not aware of involves "penalizing" popular movies that a user is already likely aware of. Given this exemplary utility function, the probability of a particular movie having been watched is first calculated given the other movies that the user is known or assumed to have watched (i.e., implicit or explicit observations, as described below). This calculated probability is then "discounted" by an overall popularity of the movie; the discounted probability is then used as the utility for recommending potential movies to the user in accordance with the present invention.

Regardless of what type of function is used, once the upper bounds of the function of the probability distributions, i.e. the "utility," for each object have been sorted, a set of user preferences for at least one user is then obtained using either conventional explicit or implicit methods. For example, one common method for explicitly obtaining user preferences involves simply asking a user to rate particular objects, such as topics, items, products, books, movies, food, drinks, etc., on some predefined schedule. Alternatively, user preferences with respect to particular objects may be implicitly identified by simply identifying whether a user has used, purchased, viewed, etc., such objects. Further, another common method for implicitly obtaining user preferences involves observing user behavior in order to impute particular preferences to that user. Examples of such observation include observing a user's Internet web browsing behavior, i.e., what items or objects does the user look at while browsing; observing a user's purchasing history to see what the user buys, when the user buys, and where the user buys; and observing other available informational patterns. Clearly, any conventional technique for either implicitly or explicitly determining user preferences or some combination of both implicit and explicit determination of user preferences may be used to determine a set of user preferences.

The probabilistic model is then used to predict or recommend a set of at least one most likely user choice from the set of objects by using the set of user preferences. In accordance with the present invention, such predictions or recommendations are based on the following two conditions. First, the utilities for each object in the set of objects are examined in the aforementioned sorted order until the set of highest utility user choices is full, and second, the utilities for each object in the set of objects are examined until the probability of the object with the lowest utility in the set of user choices is greater than the upper bound of the utility of the next sorted object in the set of objects.

In addition to the just described benefits, other advantages of the present invention will become apparent from the detailed description which follows hereinafter when taken in conjunction with the accompanying drawing figures.

BRIEF DESCRIPTION OF DRAWINGS

The specific features, aspects, and advantages of the present invention will become better understood with regard to the following description, appended claims, and accompanying drawings where:

DETAILED DESCRIPTION

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
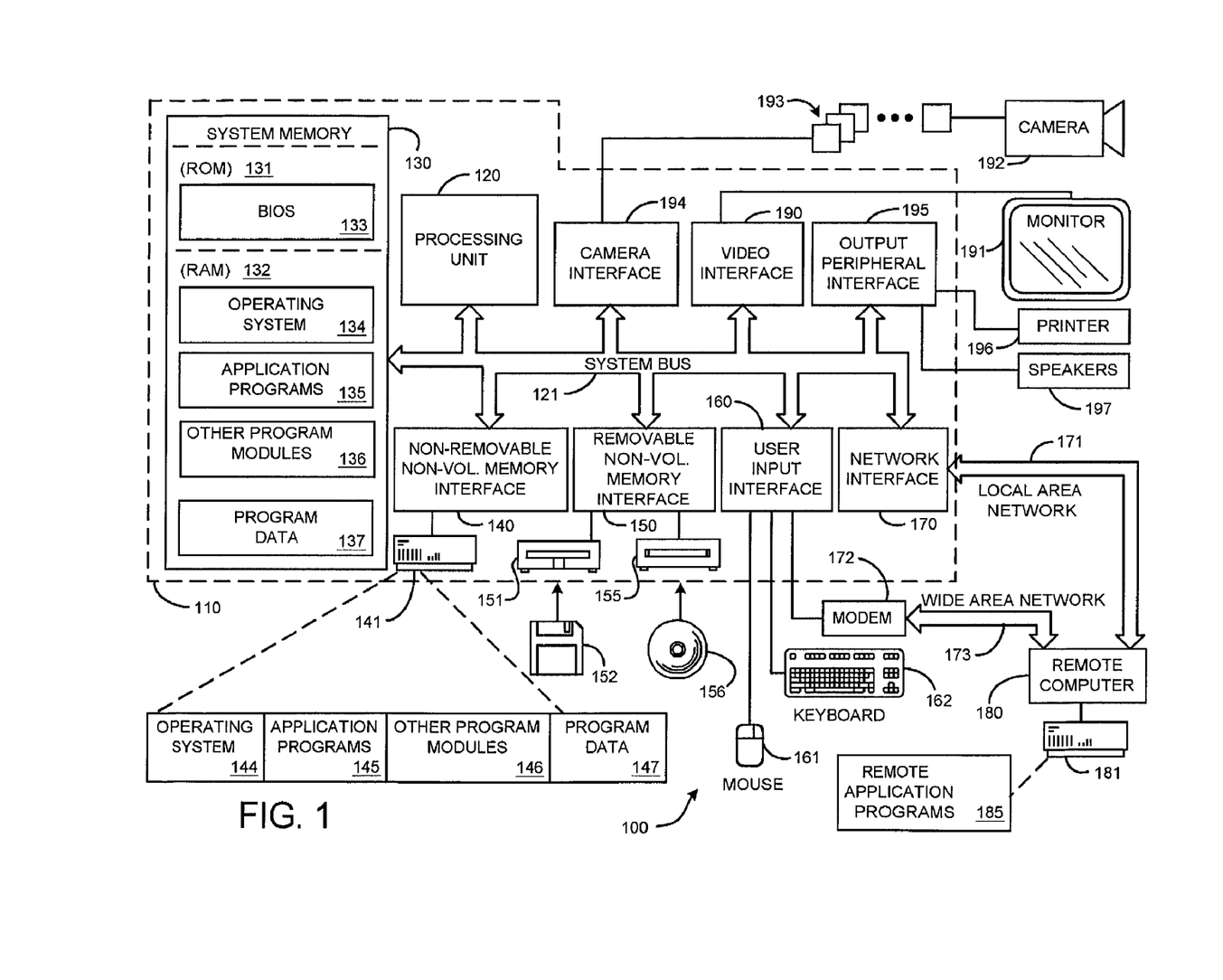
FIG. 1 is a diagram depicting a general-purpose computing device constituting an exemplary system for implementing the present invention.

Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras could be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194. This interface is connected to the system bus 121, thereby allowing the images 193 to be routed to and stored in the RAM 132, or any of the other aforementioned data storage devices associated with the computer 110. However, it is noted that image data can be input into the computer 110 from any of the aforementioned computer-readable media as well, without requiring the use of a camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and process embodying the present invention. The program modules associated with automatically determining at least one highest utility recommendation from a local probabilistic recommendation system without examining the probability for every possible object will be described first in reference to the system diagram of FIG. 2. Then, the processes for automatically determining at least one highest probability recommendation from a local probabilistic recommendation system without examining the probability for every possible object will be described with reference to the flow diagram of FIG. 3.

Figure 2:
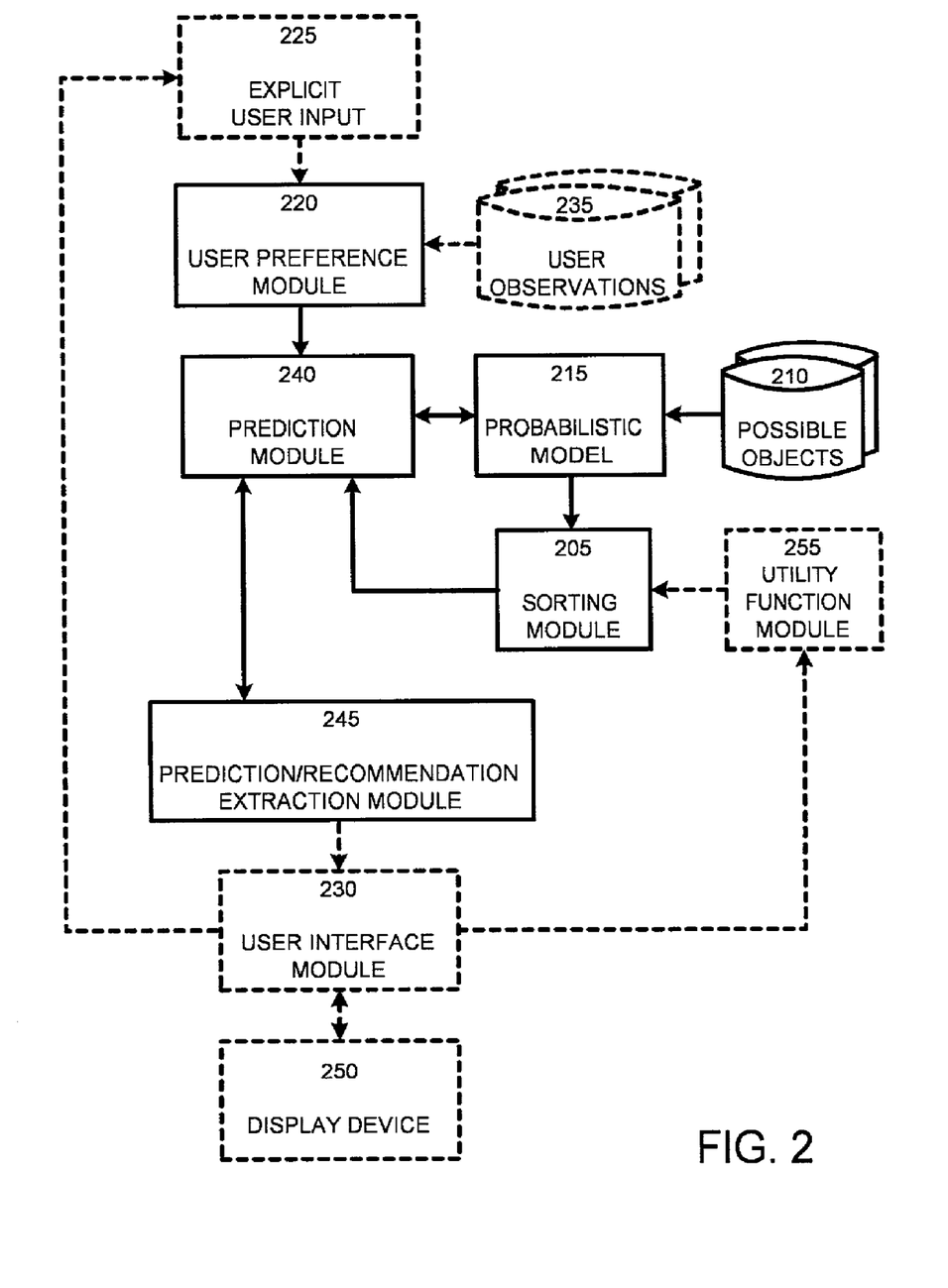
FIG. 2 is a system diagram that depicts program modules employed in a system for determining at least one highest probability recommendation from a local probabilistic recommendation system in accordance with the present invention.

System Overview:

FIG. 2 is a general system diagram illustrating program modules used for determining at least one highest utility recommendation from a local probabilistic recommendation system. It should be noted that the boxes and interconnections between boxes that are represented by broken or dashed lines in FIG. 2 represent alternate embodiments of the present invention, and that any or all of these alternate embodiments, as described throughout this document, may be used in combination.

In general, a system and method according to the present invention uses the program modules illustrated in FIG. 2 for determining at least one highest utility recommendation, i.e., a "maximal utility object," from a local probabilistic recommendation system that uses a probabilistic model. In the context of the present invention, the term "utility" can best be understood in accordance with the following discussion. Specifically, "utilities" are simply any desired function of the probability distributions of the probabilistic model. For example, in one embodiment, the utility is simply the probability of a specific state for each object, while in another embodiment, the utility is any other function of the probability distribution, such as, for example, a function that combines the probability of at least one of the states of each object into a value, a weighted probability of at least one specific state, or some weighted sum of the probability of all states. Clearly, any desired function can be used in the context of the present invention.

Further, the system and method of the present invention is capable of providing such recommendations for any entity. Such entities include, for example, a person or user to whom recommendations as to possible choices or objects are provided, a computer-based system, such as, for example, a computer operating system where the recommendations are related to probabilistic fault diagnosis, or recommendations as to particular stock picks for a computer program used for automatic stock trading. Clearly, such a system and method can be used for any entity and with any type of choice or object for which for which probabilistic recommendations can be made. However, for purposes of explanation only, the following discussion will focus on using the system and method of the present invention to provide recommendations of likely user choices for at least one set of objects. Clearly, as noted above, it should be appreciated by those skilled in the art that, in the general case, the system and method of the present invention is not limited to merely providing recommendations of such likely user choices.

The probabilistic model can be any conventional type of probabilistic distribution or machine learning technique so long as the probabilistic model includes a probability distribution for each object represented by the model. Such techniques include, for example, Bayesian networks with decision trees as local distributions. The recommendations or predictions are determined by automatically extracting the top k recommendations or predictions from a set of objects, such as particular choices, topics, items, products, books, movies, food, drinks, etc., that are modeled by the local probabilistic recommendation system without examining the utility for every possible object for each entity for which recommendations are made. In one embodiment, the utility is simply the probability value for a particular state of each object. In another embodiment, the utility is any desired function of the probability value or distribution for representing a particular state for each object. It should be noted that such a utility function returns a scalar utility value which can be upper-bounded and sorted using any of a number of conventional methods.

The ability to extract any desired number of highest utility recommendations is accomplished by first sorting upper bounds of the utilities for each object represented by the probabilistic model in order of highest to lowest. In other words, the present invention is capable of sorting any possible function of the probability distributions representing the objects for determining likely user choices. Thus, in a general embodiment, the utility simply represents a probability of a specific "state" for each object which corresponds to the user preferring that object in some manner, i.e., the user "watched" a particular movie or "read" a particular book. Thus, in this general embodiment, the sorting actually involves sorting on the probability of that specific state. However, in the more general sense, where the utility is any arbitrary function of the probability distributions, the sorting involves simply sorting on the function of the probability that the user will prefer the object.

The sorting step need only be performed once, as the sorted utilities may then be used for making predictions or recommendations for all subsequent users. However, in one embodiment, as more data becomes available to the probabilistic model, the probability distributions for the probabilistic model are periodically updated using conventional methods. When the probabilistic model is updated, the upper bounds of the utilities for each object are again sorted in order of highest to lowest. In either case, once the upper bounds of utilities for each object have been sorted, a set of user preferences for at least one user is then obtained using either conventional explicit or implicit methods for determining user preferences as described below. It should be noted that in the general case of providing recommendations for any arbitrary entity, rather than particular users, the set of user preferences is generalized to simply obtaining a set of "known object values" for a particular entity using conventional techniques analogous to the methods described below for obtaining particular user preferences.

The probabilistic model is then used to predict or recommend a set of at least one most likely user choice from the set of objects by using the set of user preferences. In accordance with the present invention, such predictions or recommendations are based on both of the following two conditions. First, the utilities for each object in the set of objects are examined in the aforementioned sorted order until the set of highest utility user choices or recommended objects is full, and second, the utilities for each object in the set of objects are examined until the utility of the object with the lowest utility in the set of user choices or recommended objects is greater than the upper bound of the utility of the next sorted object in the set of objects.

In accordance with preceding discussion, a system and method according to the present invention operates to automatically determine at least one highest utility recommendation from a local probabilistic recommendation system without examining the utility for every possible object. Specifically, as illustrated by FIG. 2, this is accomplished by first using a sorting module 205 for sorting the upper bounds of the utility for each object 210 in a probabilistic model 215. Further, in the aforementioned embodiment where the probability distributions of the probabilistic model 215 are updated, the upper bounds of the utilities for each object 210 are again sorted via the sorting module 205 in order of highest to lowest prior to extracting the highest probability recommendations as described herein.

Next, a set of user preferences, or known object values for an entity, is obtained for a particular user or entity via a user preference module 220. These preferences are obtained either explicitly or implicitly using conventional techniques. For example, one common method for explicitly obtaining user preferences involves asking a user to rate particular objects, such as topics, items, products, books, movies, food, drinks, etc., on some predefined schedule. Such explicit user input 225 is provided via a user interface module 230 that uses conventional techniques for entering user preference data or information.

One common method for implicitly obtaining user preferences is to simply identify whether a user has used, purchased, viewed, etc., such objects. In addition, another common method for implicitly obtaining user preferences involves using a set or database of user observations 235 to infer user preferences using conventional techniques. In particular, user behavior is observed and provided to the user preference module 220, which uses conventional techniques in order to impute particular preferences to that user. Examples of such observation include observing a user's Internet web browsing behavior, i.e., what items or objects does the user look at while browsing; observing a user's purchasing history to see what the user buys, when the user buys, and where the user buys; and observing other available informational patterns. Clearly, the user preference module 220 may use any conventional technique for either implicitly or explicitly determining user preferences, or alternately, a combination of both implicit and explicit determination of user preferences can be made by the user preference module.

Next, once the user preferences have been determined as described above, the prediction module 240 begins predicting or recommending likely user choices using the set of user preferences provided via the user preference module 215 in combination with the probabilistic model 210. In general, providing such predictions using a probabilistic model in combination with a set of user preferences is common to most conventional collaborative filtering or recommender systems. However, unlike such systems, the present invention uses a prediction/recommendation extraction module 245 to avoid making predictions for all possible objects 210 represented by the probabilistic model 215.

In particular, this is accomplished by providing the sorted upper bounds of the utilities to the prediction module 240. The prediction module then begins to examine the utility for each object 210 in the probabilistic model 215 in the order of sorted upper bounds of the utilities for each object. In other words, the prediction module 240 begins to determine the utility for each object for a particular user by looking first at the objects that have, for some set of user preferences (not necessarily the preferences of the particular user), the highest utilities. As noted above, these utilities can be any desired function of the probability distributions. Thus, for example, in one tested embodiment, the utilities are simply the unmodified probability values for the specific states representing likely user choices, while in another tested embodiment, the utilities represent weighted probability values of specific states representing likely user choices as described in further detail below.

For example, in the embodiment where the utility involves weighting the specific probability values corresponding to particular user preferences, the upper bounds of the specific probability values are weighted via a utility function module 255 that, in this embodiment, provides weights or a weighting function to the sorting module 205 for weighting the upper bounds. Further, in a related embodiment, the weights assigned to the upper bounds of the specific probability values are user adjustable or configurable via the user interface 230. When the upper bounds are weighted, they are again resorted in order of highest to lowest via the sorting module 205. Further, the user interface 230 is used in other alternate embodiments for allowing the user to specify custom utility functions, or for modifying existing utility functions, such as, for example by adjusting the weights as described above.

In the aforementioned embodiment where a utility function other than an identity function of a probability is used, the probabilities for particular types, categories, sub-categories, or groups of categories or sub-categories of objects are either negatively or positively weighted, using a utility function f, to either increase or decrease the likelihood that the particular types, categories, sub-categories, or groups of categories or sub-categories of objects will be recommended to the user. Such a utility function can be any conventional function to either increase or decrease the probability of particular objects. For example, one method of weighting probabilities can be to simply multiply particular probabilities by a predetermined or user definable scaling factor. In other words, the system and method of the present invention allows for selective weighting of objects in order to better tailor recommendations to particular user preferences. This type of utility function is described in further detail below.

The prediction/recommendation extraction module 245 then recommends a set of the top k objects for the user based on the following two rules: First, each object is examined in order of decreasing upper bound utility until k objects have been recommended; and second, this recommendation process continues until such time as the lowest utility recommendation from the set of k recommendations is greater than the next lowest sorted upper bound utility. In this manner, a system and process according to the present invention avoids the necessity to determine utilities for every object for each user. In one embodiment, the set of the top k recommended or predicted objects is then provided for output on a conventional display device 250.

Operation:

The system and method of the present invention is capable of using probabilistic recommendation systems based on any conventional type of probabilistic distribution or machine learning technique, including, for example, Bayesian networks with decision trees as the local distributions. For example, one conventional method for probabilistically recommending movies includes building a probabilistic model over a set of variables $M=\{M_1, \ldots, M_n\}$, where $M_i$ is a binary variable denoting whether or not a user has seen the ith movie. The model is constructed such that, for each movie i, the conditional probability, $p(M_i=\text{watched}|M\setminus\{M_i\})$ is extracted for each movie. In general, such a method is used to recommend movies as follows: for each movie $M_i$ that a user has not watched, the probability that the user would have watched the movie is calculated based on the assumption that it is unknown whether the user has actually watched movie $M_i$. Such a method then recommends those movies that have the highest posterior probability. In particular, such a method determines the probability for every movie, then sorts those probabilities and provides a partial or complete sorted list in order of highest to lowest probability that the user would like to watch each movie.

A system and process according to the present invention builds on the concept of using a conventional probabilistic model for providing recommendations by first identifying an upper bound for utilities as described above. Thus, for example, in one embodiment, using the illustration of recommending movies provided above, the utility function is simply the value that the actual un-weighted probability distributions assign to the "watched" state for particular movies. Thus, in this embodiment, where the utility represents an identity function of the probability, an upper bound $B_i$ of the utility for each movie $M_i$, i.e., $u(M_i)$, is identified such that:

$$u(M_i)=p(M_i=\text{watched}|M\setminus\{M_i\})<=B_i \qquad \text{Equation 1}$$

for all values of M.

In an alternative embodiment of the present invention, the utility of recommending an object such as movie i, or $u(M_i)$, is a function that adjusts $p(M_i=\text{watched}|M\setminus\{M_i\})$ by an overall popularity of the movie (or $p(M_i=\text{watched})$ as described in further detail below. Such an embodiment is useful for recommending objects such as movies to a user where the movies are less likely to be known to the user. Determining the overall popularity is achieved using any of a number of conventional probabilistic methods for analyzing a database of previous user choices or preferences. The objects are then pre-sorted in order of utility from highest to lowest, or, in other words, by descending values of $B_i$.

Specifically, where a utility function other than an identity function of the distribution at a particular state is used, the probability distributions for particular types, categories, sub-categories, or groups of categories or sub-categories of objects can be negatively or positively weighted, using a utility function f, to either increase or decrease the likelihood that the particular types, categories, sub-categories, or groups of categories or sub-categories of objects will be recommended to the user. It should be noted that the utility function f returns a scalar utility value which can be upper-bounded and sorted using any of a number of conventional techniques. Further, it should also be noted that the utility function f can be a function of either one or more select states, or can be a function of the entire distribution. Such a utility function can be any conventional function to either increase or decrease the probability of recommending particular objects. For example, one method of weighting probabilities can be to simply multiply the probabilities by a predetermined or user definable scaling factor. In other words, the system and method of the present invention allows for selective weighting of objects in order to better tailor recommendations to particular user preferences.

In particular, assuming that $X=\{x_1, \ldots, x_n\}$ denotes a set of objects or variables in the domain of interest, then the probability that a particular user is interested in a particular object $x_i$ can be denoted by $p(x_i=\text{State}_j|X\setminus\{x_i\})$, where $\text{State}_j$ represents the particular state of the object, such as, for example that the user "ate" a particular food, "watched" a particular movie, "read" a particular book, etc. Consequently, Equation 2 is used to denote the use of the aforementioned utility function to weight the probability:

$$f(p(x_i=\text{State}_j|X\setminus\{x_i\}))<=WB_i \qquad \text{Equation 2}$$

where $WB_i$ represents the weighted upper bound of the probability distribution for $x_i$ for $\text{State}_j$. Further, as noted above, the utility function f can be a function of the entire distribution. Consequently, such a function can consider multiple possible states for a given object, or may consider states of two or more objects. For example, assuming binary "states" of a user having either "read" or "not read" a particular book, $\text{Book}_1$, one exemplary utility function f considering both possible states can be represented by Equation 2A:

$$f(p(\text{Book}_1))=((p(\text{Book}_1=\text{Read})*2)+p(\text{Book}_1=\text{Not Read})/34) \qquad \text{Equation 2A}$$

Returning to the movie example provided above, if a user is interested in only "R-Rated" movies, then the probabilities associated with all non R-Rated movies can be reduced in weight using a utility function to reduce weight of such movies, thereby decreasing or eliminating the likelihood that any non R-Rated movie will be recommended. Similarly, the probabilities associated with all R-Rated movies can be increased in weight using a utility function to increase the weight of such movies, thereby increasing the likelihood that R-Rated movies will be recommended. Clearly, this concept is extensible to any type, category, sub-category, or group of categories or sub-categories of objects. Consequently, any desired type, category, sub-category, or group of categories or sub-categories of objects can be negatively or positively weighted, or filtered in such a way as to allow for selective recommendations that are better tailored to particular user preferences.

Further, in one embodiment, different weights are assigned to different objects, or groups or categories of objects. For example, returning again to the movie example, R-Rated movies can be given a first weight for a particular user, while "PG-Rated" movies are given a second weight, and all other rated movies either given a third weight, or no weight at all. In this manner, the recommendations provided for a given user can be better tailored to that user. Further, in one embodiment, as discussed above, the weights are user adjustable. Consequently, user adjustment of weights and categories of weights can serve to allow a user to implement "what-if" type scenarios. In other words, the user can change the weights of particular objects or groups or categories of objects in order to see what new recommendations will be provided by a system and method in accordance with the present invention.

In another alternate embodiment of the utility function, as mentioned above, less popular objects are recommended by assigning a "penalty" to more popular objects to create a "popularity filter." In one embodiment the penalty is assigned to more popular objects based on the assumption that a particular user is likely to already be aware of more popular objects, and thus would like to have recommendations as to objects that the user might like, but that the user is unaware of. In particular, when returning the top k objects that are functions of the probabilities, as opposed to the probabilities themselves, as described above, the idea of the popularity filter is to filter out of the recommendation list those items that the user is already likely aware of. In the movie example, provided above, the popularity filter is used to recommend less well known movies that the user might like, while filtering out the generally popular movies that the user is already likely aware of.

For example, one embodiment of the popularity filter in accordance with the present invention is implemented as described below, and as illustrated by Equation 3. In particular, first, a "penalty" is defined for each object individually in order to weight each object with respect to all other objects, or alternatively a single penalty is defined for all objects, or to particular categories or subcategories of objects. Further, in still another embodiment, the penalty is user adjustable. One use of such an embodiment is to allow increasingly obscure objects to be recommended to the user by simply increasing the penalty, and thus reducing the weight, for more popular objects. In a tested embodiment, penalties in the range of between 0 and 1 were used, however, it is clear that other penalty ranges may also be used. In addition, it should be noted that in accordance with Equation 3, a penalty value of zero is the same as using the probabilities without a penalty. In other words, using a penalty of zero has the same effect as not assigning penalties at all.

Specifically, in describing one exemplary implementation of the popularity filter, the aforementioned movie notation $M_i$ is used to denote the event that the user is interested in movie i. Next, the probability for a particular movie $M_i$ is set to 1, i.e., $p(M_i=1)$, to indicate the marginal probability that a user in the general population of users has watched the movie i. The system and method of the present invention then returns those movies from the set of all movies M with the top k values for:

$$(1 - p(M_i))^{\frac{penalty}{1-penalty}} \quad \text{Equation 3}$$

where again, penalty is in [0, 1). It should be noted that in this example, the utility function f is represented in Equation 3 by the multiplication by the term provided as Equation 4:

$$p(M_i = 1 \mid M \setminus \{M_i\}) \times (1 - p(M_i))^{\frac{penalty}{1-penalty}} \quad \text{Equation 4}$$

Note also that a penalty value of zero is the same as using the probabilities without a penalty as described above, as the utility function will simply equal one when the penalty is set to zero. Clearly, as discussed above, the utility function may be any function or scaling factor that can be used to weight or otherwise adjust the probabilities for either increasing or decreasing the probability of the state associated with particular objects. Further, the principles described herein are clearly extensible to any type, set, category or subcategory of objects. Again, as with the aforementioned embodiment where different weights are assigned to different objects or categories of objects, in another embodiment, different penalties are assigned to different objects or categories of objects. For example, one implementation of using different penalties is to simply provide the highest penalty for the object having the highest probability distribution upper bound. Decreasing penalties can then be assigned to the remaining objects in decreasing order of their probability distribution upper bound. Clearly, this concept is not limited to this trivial example, as many other methods for assigning differing penalties to particular objects or groups or categories of objects can be identified in accordance with the present invention.

Regardless of what kind of utility function is used, the system and method of the present invention then uses any of a number of conventional probabilistic methods to begin extracting the utility for the objects for a particular user in the given sorted order, creating a list of the top k objects that have been recommended, i.e., those objects with the highest utility for the particular user. The determination of utility for objects is then automatically terminated as soon as two conditions are met. The first condition is that at least k objects have been recommended, while the second condition is that the utility of the lowest-utility object in the list of k objects is greater than the upper bound of the next object based on the aforementioned pre-sorting of objects.

One example of determining the upper bounds for each object involves using a decision tree for determining user recommendations. In particular, using a decision tree, each leaf in the tree corresponds to a potential value for the state of the object. Thus, the upper bound for each object is identified by traversing the leaves of the tree and extracting the highest probability state for each object. The objects are then sorted from highest to lowest probability, as described above.

In view of the preceding discussion, the above-described program modules (See FIG. 2) are employed to automatically determine at least one highest probability recommendation from a local probabilistic recommendation system using the exemplary process that will now be described. This process is depicted in the flow diagram of FIG. 3 as a series of actions that illustrates an exemplary method for implementing the present invention. It should be noted that the boxes and interconnections between boxes that are represented by broken or dashed lines in FIG. 3 represent alternate embodiments of the present invention, and that any or all of these alternate embodiments, as described throughout this document, may be used in combination.

Figure 3:
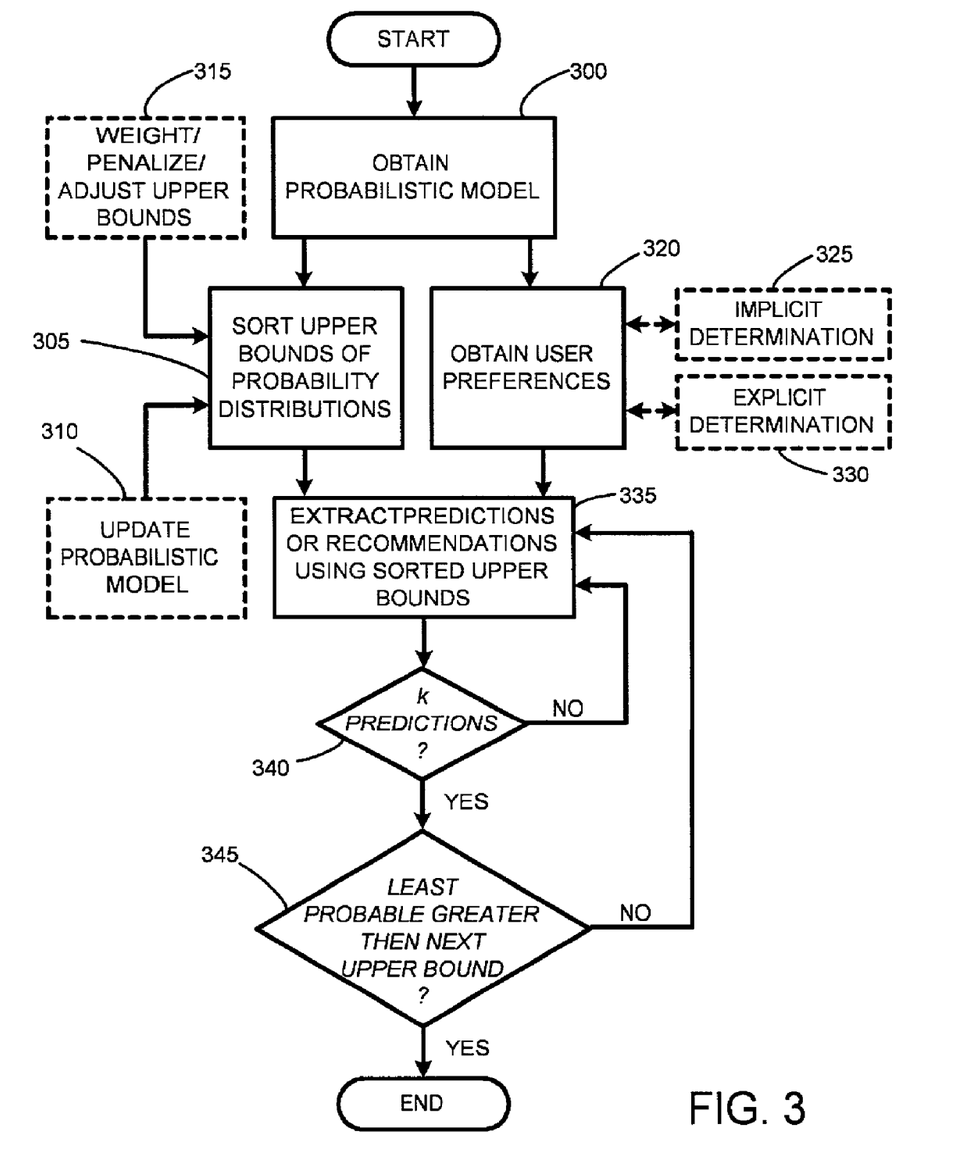
FIG. 3 is a flow diagram illustrating an exemplary process for implementing the program modules of FIG. 2 according to the present invention.

Specifically, as illustrated by FIG. 3, a system and process according to the present invention is started by obtaining a probabilistic model 300, such as by learning or creating one using conventional machine learning techniques, or by otherwise manually or automatically creating the probabilistic model using conventional techniques as described above. Similarly, existing probabilistic models, however created or obtained are also usable by the system and process of the present invention. Next, as described above, the upper bounds of the probabilistic model are sorted 305 in order of highest to lowest. Further, this sorting step 305 is repeated in one previously described alternate embodiment where the probabilistic model is updated 310 after an initial sort. Similarly, in another previously described embodiment, where the upper bounds are weighted, penalized, or otherwise adjusted via a utility function 315, as described above, the upper bounds are again sorted 305. However, it should be noted that in one embodiment, weighting, penalizing, or otherwise adjusting the upper bounds 315 is performed prior to the initial sort 305.

Next, a set of user preferences is obtained 320, either implicitly 325, or explicitly 330, as described above. Next predictions or recommendations are made 320 using both the probabilistic model, and the user preferences. As described above, predictions are made by examining the objects represented by the probabilistic model in the aforementioned sorted order. Once a desired number, k, of recommendations have been extracted 340, the utility of the lowest utility object in the set of k recommended objects is compared to the next sorted upper bound 345. If the utility of the lowest probability object in the set of k recommended objects is less than the next sorted upper bound 345, the system and process of the present invention continues to examine the objects 335 represented by the probabilistic model in order of the sorted upper bounds. Any recommended objects in the set of k recommended objects which have a lower utility than the next examined object represented by the probabilistic model is replaced by that object. This process continues until such time as there are no more objects represented by the probabilistic model which have an upper bound greater than the lowest utility object in the set of k recommended objects.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A system for automatically determining a set of at least one maximal utility object from a set of at least one object represented by a probabilistic model, comprising:
   determining an upper bound for the utility of each object;
   sorting the objects by the upper bounds in order of highest to lowest;
   obtaining a set of known object values for a particular entity;
   using the probabilistic model in combination with the information known about an entity to begin predicting the set of maximal utility objects from the set of objects;
   examining the utilities associated with each object in the set of objects in the sorted order for selecting maximal utility objects until the set of maximal utility objects is full; and
   continuing the examination of utilities until the utility associated with a lowest utility object in the set of maximal utility objects is greater than the upper bound of the utility of a next sorted object in the set of objects.

2. The method of claim 1 wherein the entities represent users and wherein the objects represent possible user choices.

3. The system of claim 1 further comprising a utility function for adjusting the upper bounds of the utilities.

4. The system of claim 3 wherein the upper bounds of the utilities are weighted via the utility function.

5. The system of claim 4 further comprising a user interface for weighting the upper bounds of the utilities.

6. The system of claim 3 wherein different weights are assigned to upper bounds of the utilities associated with different objects.

7. The system of claim 3 wherein different weights are assigned to upper bounds of the utilities associated with different groups of objects.

8. The system of claim 3 wherein at least one of the upper bounds of the utilities having a highest value is assigned a penalty for reducing the magnitude of the upper bound.

9. The system of claim 3 wherein the objects are resorted by the upper bounds from highest to lowest after adjusting the upper bounds.

10. A computer-readable medium having computer executable instructions for dynamically extracting at least one highest probability object recommendation from a probabilistic model without examining all possible probabilistic recommendations from the probabilistic model, said computer executable instructions comprising:
    extracting upper bounds of particular states of probability distributions for objects represented by the probabilistic model;
    sorting the upper bounds in order of highest to lowest;
    examining objects represented by the probabilistic model in order of the sorted upper bounds for each object for determining at least one highest probability object recommendation; and
    terminating the examination of the objects as soon as the upper bound of the lowest probability recommended object is greater than an upper bound of a next sorted object.

11. The computer-readable medium of claim 10 further comprising a user interface for defining a utility function for adjusting the upper bound of the particular states of the probability distribution for at least one of the objects.

12. The computer-readable medium of claim 10 further comprising a user interface for assigning at least one unique utility function for individually adjusting each of the upper bounds of the particular states of the probability distributions of at least two sub-groups of the objects.

13. The computer-readable medium of claim 10 further comprising using a set of user preferences in combination with the probabilistic model for determining the at least one highest probability object recommendation.

14. The computer-readable medium of claim 10 wherein the probabilistic model is a decision tree.

15. The computer-readable medium of claim 10 wherein the probabilistic model is a neural network.

16. The computer-readable medium of claim 10 wherein the probabilistic model is automatically generated using machine learning techniques.

17. A method for determining at least one highest probability recommendation from a probabilistic model, said model representing at least one object using a probability distribution for representing each object, comprising:
    determining an upper bound of a particular state of the probability distribution representing each object;
    sorting each object represented by the probabilistic model by sorting the upper bounds associated with each object in order of highest to lowest;

determining a set of user preferences for a particular user;

extracting at least one highest probability recommendation from the probabilistic model based on the set of user preferences for the particular user, wherein the objects represented by the model are examined in the sorted order for extracting the at least one highest probability recommendation; and terminating the examination of the objects and the extraction of highest probability recommendations as soon as a lowest upper bound of any of the highest probability recommendations is greater than an upper bound of a next sorted object.

18. The method of claim 17 wherein the set of user preferences is determined implicitly.

19. The method of claim 17 wherein the set of user preferences is determined explicitly.

20. The method of claim 17 wherein a utility function is used to adjust the upper bounds associated with at least one of the objects represented by the probabilistic model.

21. The method of claim 17 wherein at least one of the objects having the highest upper bounds are assigned a penalty for reducing a magnitude of those upper bounds so as to reduce a probability of those objects being recommended.

22. The method of claim 21 wherein the penalty is user adjustable.

23. The method of claim 20 wherein the utility function is adjustable via a user interface.

* * * * *